April 27, 1965  G. W. HAYS  3,180,160
INDEXING MECHANISM
Filed May 18, 1962  3 Sheets-Sheet 1

INVENTOR
GORDON W. HAYS
BY
*Wentworth C. Clapham*
ATTORNEY

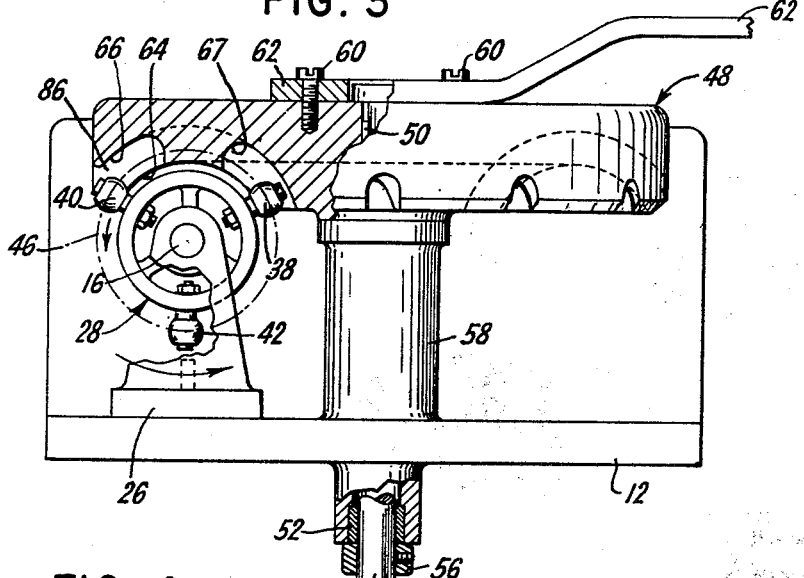
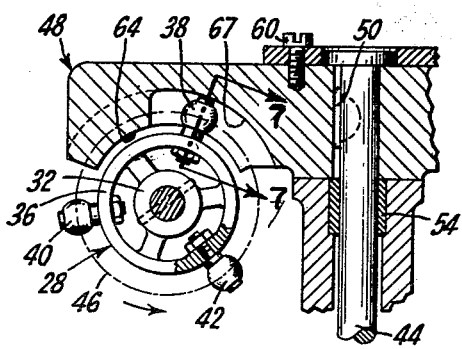
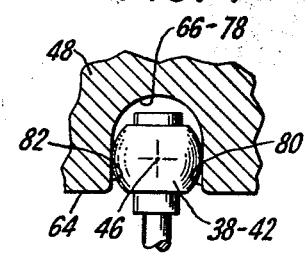
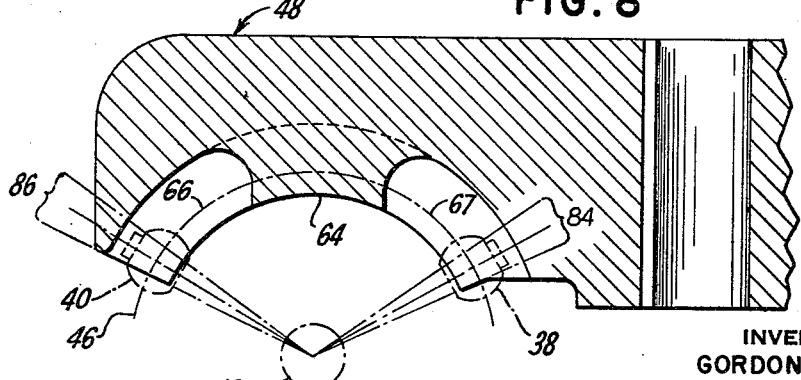

April 27, 1965 G. W. HAYS 3,180,160
INDEXING MECHANISM
Filed May 18, 1962 3 Sheets-Sheet 3

INVENTOR
GORDON W. HAYS
BY
ATTORNEY

United States Patent Office 3,180,160
Patented Apr. 27, 1965

3,180,160
INDEXING MECHANISM
Gordon W. Hays, Springdale, Conn., assignor to American Machine & Foundry Company, a corporation of New Jersey
Filed May 18, 1962, Ser. No. 195,922
16 Claims. (Cl. 74—84)

This invention relates to improved mechanical indexing mechanisms which impart programmed rotary motion to an angularly displaceable member.

It is intended that this invention be applicable generally to machines, apparatus and devices in various technical fields requiring programmed angular motions to any number of predetermined index stations which may be equally or unequally spaced, such stations requiring an approach from either direction, or a combination of a forward and/or reverse direction with a specific motion characteristic which may differ from station to station. An example of an application is to move the bowling pin distributor conveyor about a pivot point to deliver in succession, a bowling pin to each of the ten bowling pin triangularly arranged spotter cups in an automatic bowling pin spotting machine. Another possible application is to control the turning movements of the driving mechanism in an automatic wrapping machine having operations of timed duration as determined by the angular position of the package forming devices associated therewith. A third suggested application is to control an electrical rheostat or an electrical multi-contact switch, single layer or ganged, in electronic programming devices for lathes and the like, the mechanical movements to the plurality of predetermined electrical stations being translated to electrical signals in a timed sequential pattern.

A principal object of the invention is to angularly displace a rotatable member, in either direction, between predetermined index stations, which may be equally or unequally spaced, with uniform or non-uniform motions, varying from station to station, if desired, with any motion characteristic, in a manner so that the "down time" of the machine while it is indexing is held to a minimum with due regard given to avoiding abrupt motions which will reduce the operating life of the machine.

As contemplated according to the invention, there is provided an angular indexing device comprising a first rotatable shaft and a plurality of camming members carried by such shaft and movable in a plane perpendicular thereto. A second rotatable shaft disposed angularly to the first rotatable shaft and spaced therefrom. A cammed member carried by the second rotatable shaft and having a plurality of toroidally disposed grooves individually engageable by one of said camming members, referred to hereafter as "toroidal grooves." The axis of one toroidal groove at its entrance side for said camming members coincides with the axis of another toroidal groove at its exit side for said camming members and with the plane of said camming members.

Other objects and features of the present invention will be set forth or apparent in the following description and claims and illustrated in the accompanying drawings, which disclose by way of example and not by way of limitation, in a limited number of embodiments, the principle of the invention and structural implementations of the inventive concept.

In the drawings, in which like reference numbers designate like components in the several views:

FIGURES 3 and 4 are partial sectional and elevation views, taken along line 3—3 of FIGURE 1;

FIGURE 7 is a partial sectional view of the cam wheel and cam roller taken along line 7—7 of FIGURE 4; and FIGURE 8 is an enlarged area of FIGURE 3.

The mechanism, as is more fully described hereinafter, contains as its principal operating parts an electrical motor for motive power, a drive hub and associated parts, a driven cam wheel, a crank arm, and a support frame.

Figure 1:
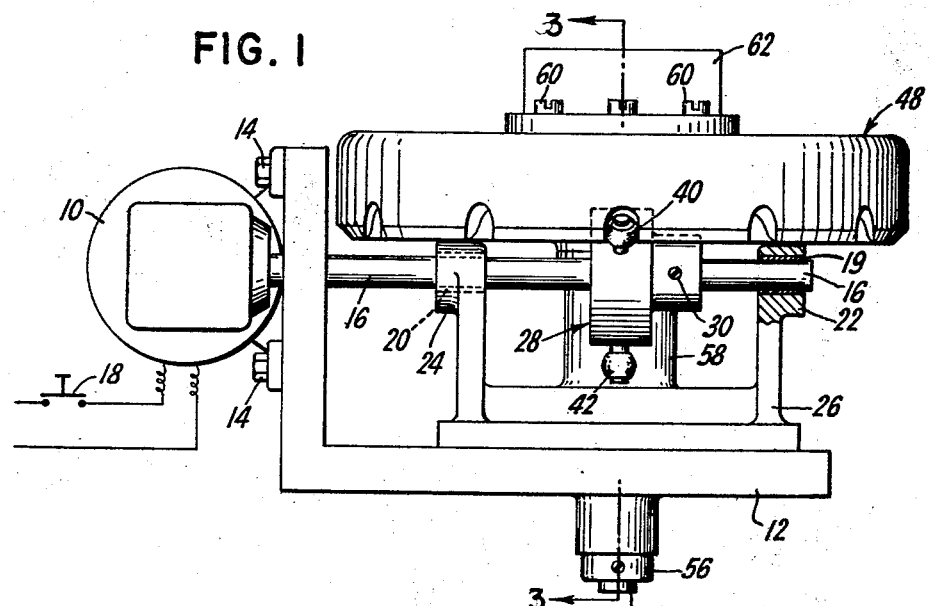
FIGURE 1 is a side elevation view of the mechanism.
Figure 2:
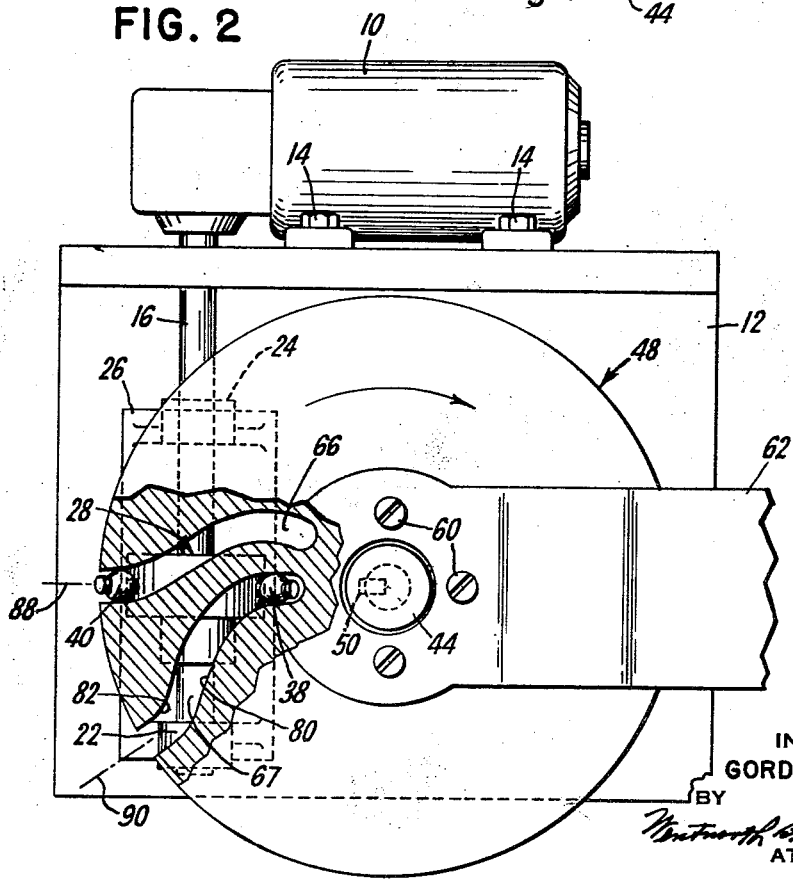
FIGURE 2 is a top plan view of the mechanism, partially broken away.

In FIGURES 1 and 2, an electric motor 10 providing motive power is affixed to support frame 12 by means of mounting screws 14. Motor 10 has a suitable internal right angle gearing arrangement (not shown) so as to rotate drive shaft extension 16, extending horizontally and to the right therefrom as viewed in FIGURE 1. Motor 10 is so arranged as to rotate drive shaft 16 counterclockwise as viewed in FIGURES 3 and 4 when energized by depressing control switch 18, thus completing an electrical circuit.

Drive shaft extension 16 is further supported by, and rotates within, bearings 19 and 20, carried by bosses 22 and 24. Bosses 22 and 24 are extensions of bracket 26, which is rigidly affixed to support frame 12. The drive shaft extension 16 carries drive hub 28 as affixed by cross pin 30. Drive hub 28 consists of an inner hub portion 32, radial spokes 34, and an outer peripheral rim 36. Affixed to the outer peripheral rim are three cam rollers, 38, 40, and 42, mounted so that their axes are mutually coplanar, perpendicular to the axis of drive shaft 16, and equiangularly spaced about the periphery of drive hub 28, the common arc thus subtended between the axis of each cam roller being 120°. Further, due to the arrangement of parts, the mutually co-planar axes of these cam rollers are also co-planar with support shaft 44, more fully described below. The active portions of these cam rollers are spherically shaped. The common circle passing through the centers of these spherical cam rollers, and having for its center the axis of drive shaft 16, will be referred to as the pitch circle 46 of the cam rollers.

A cam wheel 48 is affixed to support shaft 44 by means of key 50. The support shaft 44 rotates within bearings 52 and 54 of support boss 58, and is secured against axial shifting by shaft collar 56. Support boss 58 is an extension of support frame 12. Affixed to cam wheel 48 by means of screws 60 is a crank arm 62, which serves to drive whatever device is to be served by the mechanism.

Cam wheel 48 is generally disc shaped, with an axial mounting hole and key-slot for the above noted mounting on support shaft 44. Formed into one face of this disc is a large relief groove 64, the cross section of which is a circular segment, as may be best seen in FIGURE 3. The relief groove 64 thus formed is a hollow, or cavity, which would partially accept a ring, or torus, and the general geometry of this relief groove is termed to be toroidal in nature. By arrangement of parts, mounted relationship between the drive hub 28 and the driven cam wheel 48 is such that the axis of drive shaft 16 is held tangent to the imaginary center line of relief groove 64, this imaginary center line being the locus of centers of the generating diameter of toroidal relief groove 64. The radius from the axis of drive shaft 16 to the surface of relief groove 64 is less than the radius of the above noted pitch circle 46 of the cam rollers.

Formed into the surface of relief groove 64 are a series of cam grooves 66–78, fashioned so as to closely accept and confine cam rollers 38–42, as may be best viewed in FIGURE 7. These cam grooves are generally U-shaped, with parallel or suitably outwardly inclined flanks 80 and 82 spaced so as to provide a running fit with the spherical diameters of cam rollers. This flank construction is especially useful in providing draft in the formation of cam wheel 48, when molded of a suitable plastic, such as nylon or polyethylene. The traces of the centers of the spherical diameters of the cam rollers as they pass through the cam grooves, more fully described below, are termed the pitch lines of the cam grooves. All points on the pitch lines are thus located equidistant from the above described center line locus of the toroidal relief groove 64. As viewed in FIGURE 5, it is seen that cam grooves 66–78 generally radiate spirally outward from the axis of rotation of cam wheel 48. Further, there is located at the inner and outer extremities of the cam grooves inner radial dwell 84 and outer radial dwell 86, smoothly joining the spiral peripheral advance portion of each cam groove.

As best viewed in FIGURE 8, the arc subtended by relief groove 64 and the pitch lines of cam grooves 66–78, about the axis of drive shaft 16, is slightly greater than the 120° angular spacing of the cam rollers. This somewhat greater arc is symmetrically dispersed about axis 16, so that with cam rollers 38 and 40 located symmetrically in inner and outer radial dwells 84 and 86, respectively, as viewed in FIGURES 3 and 8, the cam rollers are equally overlapped by a small angular amount radially inwardly and outwardly by the confines of the cam grooves. The total arc subtended by inner radial dwell 84 of the cam grooves about axis 16 is equal to twice the radially inward overlap toward the axis of the cam wheel, thus being equiangularly deposed about the symmetrical position of cam roller 38, as depicted in FIGURE 8. In a like manner, outer radial dwell 86 is symmetrically equal to twice the overlap radially outward from the axis of the cam wheel.

Figure 5:
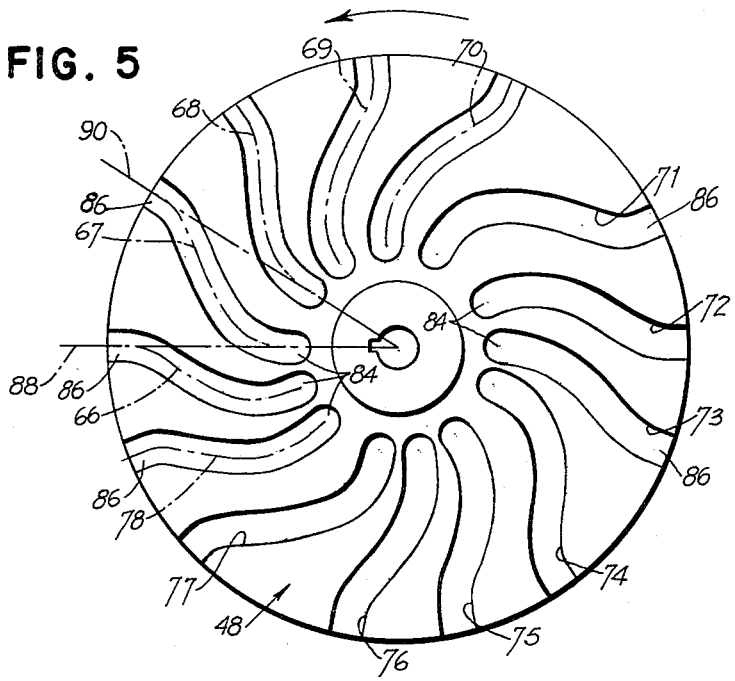
FIGURES 5 and 6 are bottom plan views of the cam wheel.

As best viewed in FIGURE 5, the pitch line of cam groove 66 in the area of its outer radial dwell 86, and the pitch line of cam groove 67 in the area of its inner radial dwell 84, are fashioned to be in radial mutually co-planar alignment along radial line 88 extending outward from the axis of the cam wheel. In a like manner, the outer radial dwell area of cam groove 67 is fashioned in said alignment with the inner radial dwell area of cam groove 68, etc. This relationship of dwell areas is maintained around the face of the cam wheel, continuing back to the starting position, with the outer dwell area of cam groove 78 being in radial alignment with the inner dwell area of cam groove 66.

Due to the described radial alignment of outer and inner radial dwell areas of adjacent cam grooves, and the mutually co-planar relationships of the pitch circle 46 with these dwell areas, the mounted relationship of the various operating parts in the at rest or starting position is as shown in FIGURES 1, 2, 3, and 8; namely, cam roller 38 is in mesh with cam groove 67 at its pitch line at the midpoint of inner radial dwell area 84, and cam roller 40 is in mesh with cam groove 66 at its pitch line at the midpoint of outer radial dwell area 86. Control switch 18 is in the open position, electrical motor 10 is de-energized and drive shaft extension 16 is at rest.

Depressing control switch 18 energizes electrical motor 10 and drive shaft 16 and drive hub 28 begin to rotate in the direction indicated by the arrows in FIGURES 3 and 4. As motion of the drive hub continues, cam roller 38 progresses generally outward from the axis of cam wheel 48 along the path of pitch circle 46 from its initial position at the midpoint of inner radial dwell 84 of cam groove 67 toward the end of the inner radial dwell furthermost from the axis of cam wheel 48.

Simultaneously with this motion of cam roller 38, cam roller 40 progresses generally outward along pitch circle 46 from its initial position at the midpoint of outer radial dwell 86 of cam groove 66 toward the end of this outer radial dwell furthermost from the axis of the cam wheel.

Due to the radial nature of these dwell areas, the pitch circle of the cam roller and the pitch lines of the cam grooves are coincident in this area of drive hub rotation, and there is no tendency of cam roller 38 and 40, acting within the confines of these cam grooves, to exert a turning effort on cam wheel 48; therefore, cam wheel 48 remains stationary while the cam followers are located in the dwell areas.

As rotation of drive hub 28 continues, cam roller 38 passes from the inner dwell area and enters the spiral acceleration portion of cam groove 67. Simultaneously, due to the above described symmetrical relationship of parts, cam roller 40 exits from the outermost extremity of the outer radial dwell area of cam groove 66, and begins to clear the confines of cam groove 66. As the pitchline of cam groove 67 now begins to depart from pitch circle 46, the spherical surface of cam roller 38 bearing against flank 82 of cam groove 67 causes cam wheel 48 to begin to rotate in the direction shown by the arrow in FIGURE 2. The beginning motion of cam wheel 48, due to the curvature of the accelerative portion of cam groove 67, is sufficiently gentle so that the profile of cam roller 40 completely clears the extremity of cam groove 66 without interference as it exits from cam wheel 48.

As motion of cam roller 38 progresses, curvature of cam groove 67 is gradually increased, thus smoothly increasing the rotational velocity of cam wheel 48 and attached crank arm 62, until the maximum desired rotational velocity is obtained near the vertical position of cam roller 38 and the midpoint of cam groove 67. At this point, the curvature of the cam groove is gently reversed and contact pressure of the profile of cam roller 38 shifts from flank 82 to flank 80 of the cam groove, thus gently slowing to an eventual smooth stop during this decleration portion of the cam wheel, crank arm, and the inertial mass of any desired device driven by the mechanism.

As cam roller 38 completes the stopping of cam wheel 48, it begins to enter the outer radial dwell 86 of cam groove 67. Concurrent with the above described action of cam roller 38, cam roller 42 has been brought up into position to enter the inner radial dwell 84 of cam groove 68, this inner radial dwell area having been brought into alignment with the pitch circle 46 of the cam rollers by the motion of the cam wheel. Curvature of the deceleration portion of cam groove 67 is sufficiently gentle so that the spherical profile of cam roller 42 begins to enter cam groove 68 without interference prior to actually coming into mesh with the pitch line of cam groove 68. Cam roller 42 now enters into full mesh with cam groove 68 as cam roller 38 enters the outer radial dwell area of cam groove 67.

If desired, the mechanism may now be stopped by releasing control switch 18, thus de-energizing electrical motor 10. Crank arm 62 has now been rotated from an accurate fixed dwell position smoothly through an accelerated and decelerated angular rotation to a new accurate fixed dwell position. Inasmuch as cam wheel 48 is firmly held in this new position by the meshed engagement of cam rollers 38 and 42, any operations of the desired device driven by crank arm 62 may now be performed. If, however, there is no requirement of the driven device to be held stationary for long periods of time, and the shorter period of time in which the driven device is held stationary as cam rollers 38 and 42 pass through the dwell areas of the cam grooves suffices for operation of the desired device, control switch 118 may be held depressed, thus permitting electrical motor 10 to continue to run. As electrical motor 10 continues to run, cam roller 42 passes through the inner radial dwell area of cam groove 68 and enters the acceleration portions of cam groove 668 as cam roller 38 passes out of the outer radial dwell area of cam groove 68 and out of mesh with the cam wheel in the above described manner. Crank arm 62 now begins again to rotate to its next desired position according to the profile of cam groove 68.

Operation of the mechanism is thus continued in an interrupted or continuous manner as required by the device to be driven, resulting eventually in a complete 360° rotation of cam wheel 48 and crank arm 62. The cam rollers will now have passed successively through all cam grooves of the cam wheel and the operating parts will again come to the initial starting position previously described, with one exception: Due to the prime relationship existing between the number of cam rollers (3) and the number of cam grooves, 66–78, (13 total) of cam wheel 48 as viewed in FIGURE 5, the cam roller located in the inner radial dwell area of cam groove 67 at the new starting position will now be 42 rather than 38 as previously noted. The cam roller located in the outer radial dwell area of cam groove 66 will now be 38 rather than 40 as previously noted. With an alternate configuration of 12 cam grooves, as viewed in FIGURE 6, grooves 91–102, this prime relationship of the number of cam rollers to cam grooves will not exist, and all operating parts will occupy identical positions at the start of each 360° cycle.

Figure 6:
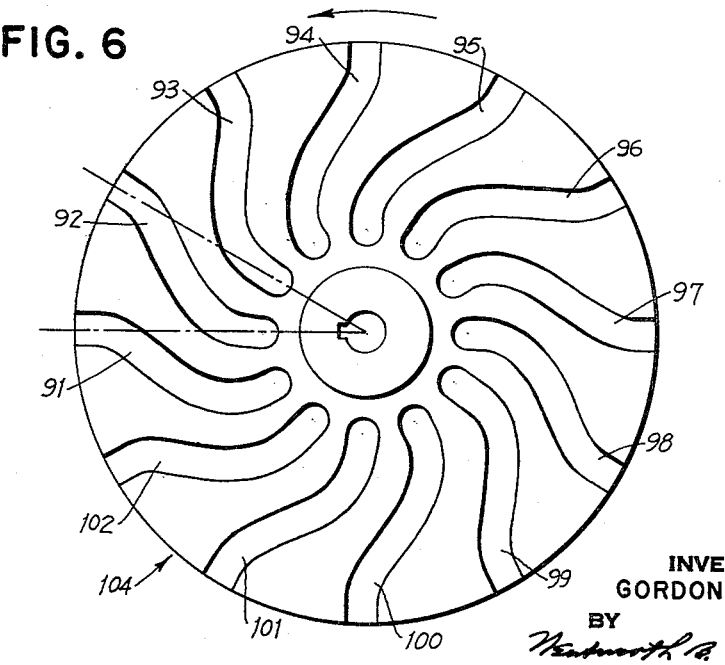

With the alternate cam wheel 104, viewed in FIGURE 6, it is seen that the angular spacings of adjacent cam grooves 91–102 are all identical, thus resulting in a regular sequence of indexing. With cam wheel 48, viewed in FIGURE 5 and described in the above description and operation sequence, the angular spacings on cam wheel 48 of adjacent cam grooves are of a randomly unequal nature, the exact spacings being dictated only by the particular requirements of any desired device to be driven. As will be obvious from the foregoing description and operation, the similarity of entering and exiting conditions as the cam rollers simultaneously enter into and exit from the inner and outer dwell areas of sequentially adjacent cam grooves, respectively, coupled with the mutually co-planar relationship of these parts, are the criteria for establishing the running mesh of a mechanism of the disclosed type, rather than any requirement of number or similarity of the active portions of the several cam grooves. Drive shaft 16 may be driven in either a uniform manner or a non-uniform manner for imparting a wide scope of repeating or non-repeating patterns of motions to the driven member 62 as influenced by cam wheels illustrated in FIGURES 5 and 6.

An indexing mechanism constructed in accordance with this invention has operated successfully in moving an elongated pin distributor conveyor (not shown) in a bowling pin spotting machine of the type shown in co-pending application, Serial No. 195,928, filed May 18, 1962, by Roy E. Blewitt, Jr., and James D. Elliott for Bowling Pin Distributing Mechanism.

Should it be desired, for reasons required by any particular device to be driven, to achieve an unusually large angular indexing from dwell area to dwell area (not shown), this can be accomplished at one or more points during the full 360° cycle in the following manner.

It will be assumed that prior to the cam wheel arriving at the point from which it is desired to achieve a prolonged angular indexing motion, operation has been identical to that previously described. The positioning of parts is now assumed to be as follows: Electrical motor 10 is energized and continues to run. The cam roller that has previously passed through the cam groove active during the preceding indexing motion has entered into and is beginning to exit from the outer dwell area of that cam groove. The cam roller next to engage the inner radial dwell area of the sequentially adjacent cam groove next to be acted upon has engaged that inner dwell area and is beginning to exit from this area into the curved acceleration portion of that cam groove.

The cam roller now passing from the inner radial dwell area of this cam groove to be utilized in accomplishing the beginning of this large dwell-to-dwell angular index enters the curved acceleration portion of this cam groove. This cam groove, however, will differ from those previously described in that the curved acceleration portion will continue throughout the major portion of the length of this groove beginning to reverse to a deceleration curvature as the active cam roller enters into that area normally reserved for the outer dwell area. This cam groove will contain no outer dwell area, the cam roller merely driving the cam wheel in motion until it exits from the cam wheel at the outer extremity of the cam groove. The radial dwell and mutually co-planar relationship of the several parts will therefore not exist at this particular groove, and compensation for this is required at the entering portion of the sequentially adjacent cam groove next to be entered.

The cam groove next to be entered by a cam roller simultaneously with the roller engaging and still driving the rotating cam wheel near its outer periphery is fashioned without the usual radial dwell area. This area of this cam groove is, rather, fashioned so that its moving pitch line, as it is presented to the entering cam roller moving along the pitch circle, identically matches relative to this entering cam roller the motion of the cam wheel revolving under the influence of the cam roller exiting from the sequentially previous cam groove. In this manner a smooth, constant mesh transfer is accomplished from cam groove to cam groove without loss of rotational velocity of this cam wheel. As the exiting roller clears the above noted previous path, the deceleration curvature of the cam groove now singly in mesh with the entering roller is increased, thus bringing the cam wheel to a smooth stop upon completion of this large dwell-to-dwell indexing motion. As this roller nears the outer area of this cam groove, it enters into a typical outer radial dwell area. Concurrently, the next roller to enter the next cam groove to be sequentially used enters a typical inner radial dwell area.

Operation may now continue, either in a typical fashion, or in combination with one or more prolonged dwell-to-dwell index operations described immediately preceding, according to the requirements of the driven device.

While there has been described and pointed out the fundamental novel features of the invention as applied to preferred embodiments, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. An angularly indexing device comprising a first rotatable shaft, a plurality of camming members carried by said first shaft and movable in a plane perpendicular thereto, a second rotatable shaft disposed transverse to said first rotatable shaft and spaced therefrom, a cammed member carried by said second rotatable shaft and having a plurality of toroidal grooves individually engageable by one of said camming members, each of said toroidal grooves having an entrance side for said camming members and an exit side for said camming members, said entrance side being spaced from said exit side, the axis of one toroidal groove at its entrance side for said camming members coinciding with the axis of an immediately adjacent toroidal groove at its exit side for said camming members and with the plane of said camming members.

2. Device according to claim 1 wherein the entrance section of said one of the toroidal grooves is engageable by one of said camming members and the exit section of said another toroidal groove is engageable by immediately adjacent one of said camming members.

3. Device according to claim 1 wherein the entrance section of said one of the toroidal grooves is engaged by one of said camming members while the exit section of said immediately adjacent toroidal groove is engaged by another one of said camming members.

4. Device according to claim 3 wherein the axis of said one of the toroidal grooves for a portion of the groove at its entrance side lies within said plane and the axis of axis immediately adjacent toroidal groove for a portion of the groove at its exit side lies within said plane, each of said toroidal grooves being spirally curved between its entrance section and its exit section, whereby the cammed member is angularly displaced between dwell periods when said first shaft is rotated.

5. Device according to claim 3 wherein said first shaft carries three equidistant and symmetrically spaced spherical camming members and the contacting walls of the toroidal grooves are tangent to the spherical camming members.

6. Device according to claim 4 wherein said first shaft carries three equidistant and symmetrically spaced spherical camming members and the contacting walls of the toroidal grooves are tangent to the spherical camming members.

7. Device according to claim 1 wherein the plurality of said toroidal grooves is prime related to the plurality of said camming members.

8. Device according to claim 1 wherein the axis of said first shaft is tangent to the imaginary center line of a toroidal depression in one face of said cammed member, such imaginary center line being the locus of centers of the generating diameter of said toroidal groove.

9. Device according to claim 1 wherein the entrance side of each toroidal groove is nearer to said second shaft than its associated exit side.

10. Device according to claim 1 wherein said first shaft is uniformly driven.

11. Device according to claim 1 wherein said first shaft is non-uniformly driven.

12. Device according to claim 1 wherein said first shaft is cyclically driven in forward and reverse directions.

13. Device according to claim 3, wherein said first shaft carries a driving member, and said camming members include a plurality of equidistantly positioned driving elements mounted on said member, and adapted to engage the walls of said toroidal grooves, and means for driving said member to effect the intermittent rotation of said cammed member.

14. Device according to claim 13 wherein said driving elements comprise cam followers, and means mounting said cam followers in equidistantly spaced arrangement on said driving member.

15. Device according to claim 1, wherein said cammed member comprises a disc, and wherein said toroidal grooves are formed in one face of said disc and extend generally radially spirally outwardly from the center point of said disc to the periphery thereof.

16. Device according to claim 15 wherein the side walls of all of said grooves are joined by a spiral arcuate section and the center line of said section lies in a vertical plane passing through the pitch line of each of said grooves.

References Cited by the Examiner

UNITED STATES PATENTS

| | | | |
|---|---|---|---|
| 379,479 | 3/88 | Koch | 74—426 |
| 850,905 | 4/07 | Busse | 74—84 |
| 1,708,542 | 4/29 | Johansson | 74—426 |
| 2,512,894 | 6/50 | Gies Kieng | 74—436 |

FOREIGN PATENTS

| | | |
|---|---|---|
| 250,289 | 8/12 | Germany. |
| 269,528 | 1/14 | Germany. |

BROUGHTON G. DURHAM, *Primary Examiner.*